Oct. 5, 1943.   W. S. WISEMAN   2,331,260
WINDOW LIFTING AND LOWERING DEVICE
Filed Nov. 12, 1941
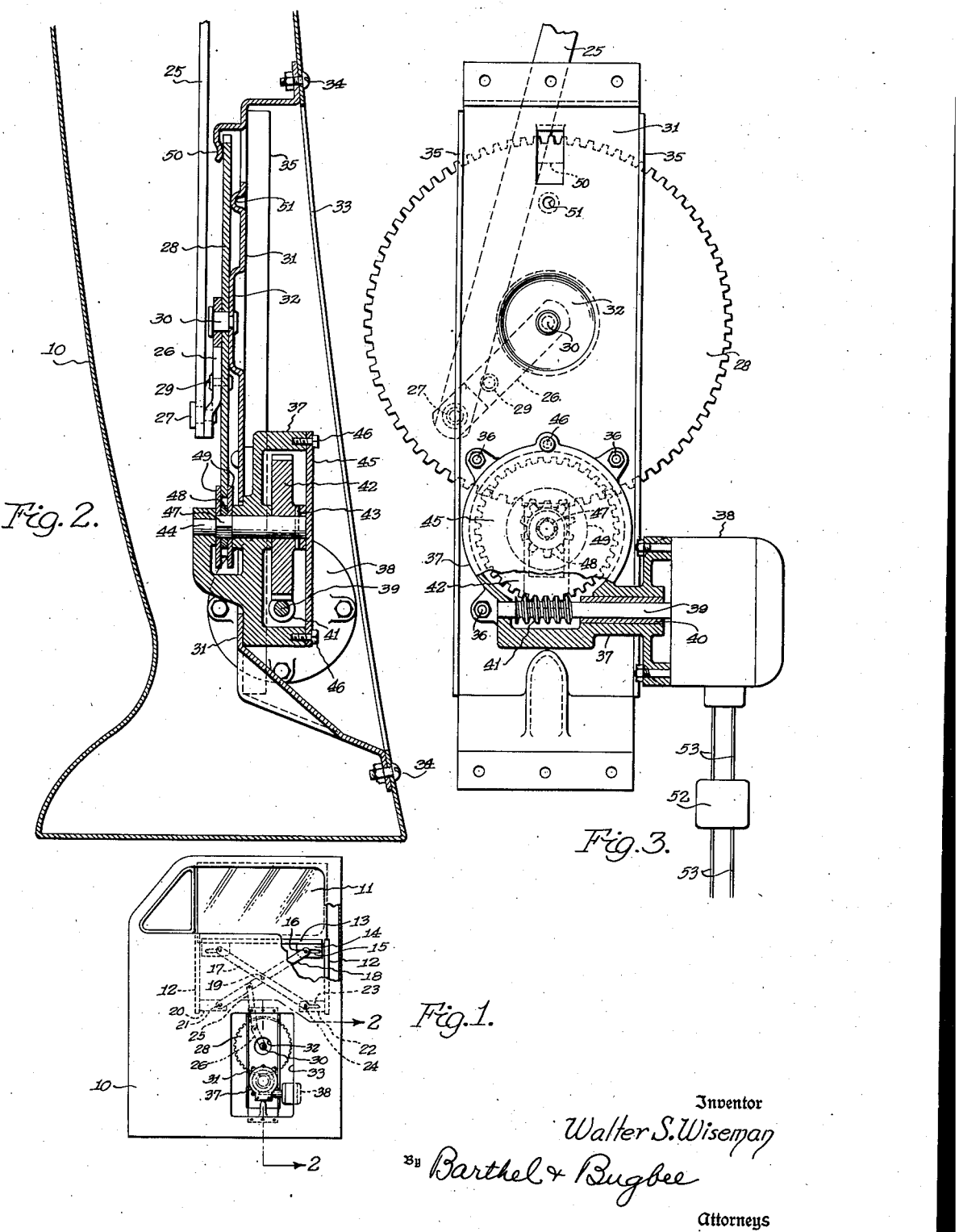
Inventor
Walter S. Wiseman
By Barthel & Bugbee
Attorneys Patented Oct. 5, 1943

2,331,260

UNITED STATES PATENT OFFICE 2,331,260

WINDOW LIFTING AND LOWERING DEVICE

Walter S. Wiseman, Detroit, Mich.

Application November 12, 1941, Serial No. 418,726

5 Claims. (Cl. 268—124)

This invention relates to a new and useful improvement in window lifting and lowering devices.

An object of this invention is the arrangement of the necessary operating parts for raising and lowering a window, such as an automobile window, by means of a motor so that the operating parts may be contained within the framework of an automobile door with no projections beyond the normal contour of the door.

Another object of the invention is to provide a single unit containing all the operating parts which may be inserted in a standard door and which may be used in conjunction with standard linkages for moving the window.

A further object of the invention is to provide a unit for raising and lowering automobile windows by a motor which may be installed in an automobile previously manufactured without such device installed as original equipment.

Still another object of the invention is to provide a unit for the purposes above outlined which may be conveniently repaired and easily replaced.

A further object of the invention is to install a motor having its axis parallel to the plane of the window which is to be raised and lowered, thereby providing a compact structure.

Other and further objects and advantages of the invention will become apparent from a reading of the following description and the appended claims, in which reference is made to the accompanying drawing, of which there is one sheet, and in which—

Fig. 1 is an elevational view of an automobile door with the present invention installed therein;

Fig. 2 is a sectional end elevational view of the device taken along the line 2—2 of Fig. 1;

Fig. 3 is a front elevational view of the device, showing the structure in detail.

The present invention is shown installed in a conventional automobile door 10, having a glass window 11 sliding vertically within a pair of vertical channels 12. To the lower edge of the window is affixed a horizontal channel 13 having a pair of depending lugs 14 at each end thereof. Within each of the lugs 14 is a horizontal slot 15 in each of which is a pin 16 extending from each of the crossed links 17 and 18 which are crossed and pivot at pivot 19.

To the lower end of one of the channel 12 is affixed a lug 20 in which is a pin 21 passing through the lower end of the crossed links 18. To the lower end of the other channel 12 is affixed a lug 22 having a horizontal slot 23 therein in which fits a pin 24 passing through the lower end of the crossed link 17.

It will be observed from the above description that, if an upwardly-directed force is applied to the lower half of the crossed link 18, this will apply an upward force upon the lug 14 attached to the lower portion of the window and tend to raise the window. Because the links 18 and 17 are pivotally connected together at 19, a similar force is likewise applied to the other lug 14, thereby applying force equally to each side of the window 11 and preventing the window from jamming in the channels 12. The fact that three of the connection between the links 17 and 18 with the lugs 14, 20 and 22 are slot and pin connections allows lateral movement of the links 17 and 18 when the downward force is applied to the link 18 and the window 10 is lowered, since the pins 16, 16 and 24 slide in their corresponding slots.

Pivotally attached to the link 18 is a link 25 which applies the upward and downward force above-described. The opposite end of the link 25 is pivotally attached to the arm 26 by the rivet 27. The arm 26 is affixed to the gear or gear-sector 28 by the rivet 29 and the pivoting-rivet 30 so that rotation of the gear 28 causes rotary movement of the arm 26 about the pivot 30.

The gear 28 is pivotally mounted on the base 31 through the pivot 30 fitting into the boss 32 in the base 31. The base 31 fits within an aperture 33 in the door 10 and is held in place by screws 34. Upstanding flanges 35 of the base 31 are provided marginally thereof to afford rigidity to the base 31.

Likewise mounted on the base 31 by bolts 36 is a casing 37. The casing 37 contains an electric motor 38 having a shaft 39 within a bushing 40 fitted within the casing 37. The opposite end of the shaft 39 comprises a worm 41. The worm 41 meshes with a worm wheel 42 which is pinned by pin 43 to shaft 44. The shaft 44 is journaled within the casing 37. A cover plate 45 is held on the casing 37 by screws 46 and bears against one end of the shaft 44 to resist endwise thrust, if any.

One portion of the shaft 44 is squared at 47 and a pinion 48 fits over the squared portion 47. The pinion 48 meshes with the gear 28. A pair of supporting plates 49 on opposite sides of the pinion 48 likewise fit over the squared portion 47 and together enclose a portion of the periphery of the gear 28 so as to keep the gear 28 and pinion 48 in mesh by preventing axial movement therebetween. It will be observed that the pinion 48 and plates 49 rotate with the shaft 44 because the former fit over the squared portion 47 of the latter.

The gear 28, which for reasons of economy is made of very thin material, is further supported and strengthened by a support 50 punched out of the base 31 and fitting behind the gear 28 and also by the projection 51 which bears against the front of the gear 28. Thereby the gear 28 is restrained from moving out of a flat plane.

The electric motor 38 is reversible. Rotation of the motor is transmitted to the worm 41 and thence to the worm wheel 42 through the shaft 44 to the pinion 48 which meshes with and turns the gear 28. Rotation of the gear 28 causes rotation of the arm 26 to which it is attached. The arm 26 acts as a crank to transmit motion to the link 25. The link 25 has a vertical component to its movement and this vertical component is transmitted to the window 11 to raise and lower the same through the crossed links 17 and 18, as has already been described.

It will be observed from Fig. 1 that when the window is closed the arm 26 and link 25 are not vertical, but are inclined with respect to the vertical. This insures that the window will be tightly closed. If the arrangement were otherwise, the link 25 might reach the top of its stroke while the window was partially open and the motor 38 continue to turn. With the present arrangement, however, when the window is tightly closed an overload is placed on the motor which causes operation of a switch 52 to shut off the current through the wires 53 and shut off the motor.

Whereas, I have specifically pointed out, illustrated and described my invention, nevertheless, it will be understood that certain modifications may be made therein without departing from the spirit of the invention as set forth in the appended claims.

What I claim is:

1. In a window regulator to be installed in a door panel for causing reciprocating motion of a closure therein having a crank, a crank-revolving device comprising a base plate mounted within said door panel, a gear casing secured to the base plate having a drive shaft, an extension formed on the gear casing projecting through an opening in the base plate and providing a bearing for said shaft, a motor having its axis parallel to the plane of revolution of the crank and supported on the gear casing, and means for transmitting motion from said motor on one side of the base plate to said crank on the opposite side of said base plate.

2. In a regulator for causing reciprocating motion of a closure having a crank, a crank-revolving device comprising a base plate mounted within a door panel with its lower end spaced from the walls thereof, a gear casing mounted on said base plate having a drive shaft, an extension formed on the gear casing projecting through an opening in the base plate and providing a bearing for said shaft, a motor mounted on and supported by said casing, and transmission means in said casing for transmitting motion from said motor on one side of said base plate through said shaft to said crank on the other side of the base plate.

3. In a regulator for causing reciprocating motion of a closure having a crank, a crank-revolving device comprising a base plate adapted to be mounted in a door panel with its lower end spaced from the walls thereof, a casing mounted on said base plate having a drive shaft projecting through an opening in said base plate, said casing having an extension projecting through an opening in the base plate and providing a bearing for the projecting end of said shaft, a motor mounted on and supported solely by said casing, and transmission means in said casing for transmitting motion from said motor on one side of the base plate through said shaft to said crank on the other side of said base plate, said transmission means including a worm, a worm wheel, and a pinion.

4. In a regulator for causing reciprocating motion of a closure having a crank, a crank-revolving device comprising a base plate adapted to be mounted within the confines of a door panel with its lower end spaced from the walls thereof, a casing mounted on said base plate on one side thereof having an extension projecting through said plate to the other side thereof, a motor mounted on and supported solely by said casing, and transmission means in said casing for transmitting motion from said motor to said crank, said transmission means including a drive shaft carried by the casing and said casing extension, a worm on the motor shaft, a worm wheel on one end of said drive shaft meshing with said worm, and a pinion on the other end of said drive shaft drivingly connected to said crank whereby a speed reduction and a power increase between said motor and said crank is obtained.

5. In a regulator for causing reciprocating motion of a closure having a crank, a crank-revolving device comprising a base plate adapted to be mounted within the confines of a door panel with the lower end spaced from the walls thereof, a casing mounted on one side of said base plate having an extension projecting through to the other side of said base plate, a motor mounted on and solely supported by said casing, a drive shaft in said casing supported on the opposite side of the base plate by said casing extension, and transmission means in said casing for transmitting motion from said motor to said crank, said transmission means including a worm connected to said motor, a shaft, a worm wheel on said shaft meshing with said worm, and a pinion on said shaft.

WALTER S. WISEMAN.